July 2, 1963 J. E. BORAH 3,095,611
MOLD
Filed Jan. 12, 1960 2 Sheets-Sheet 1
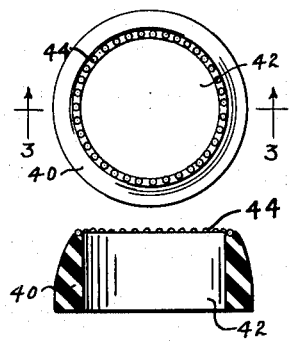
FIG. 2
FIG. 3
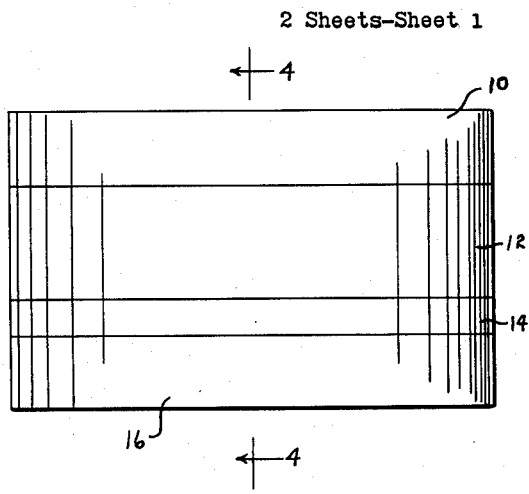
FIG. 1
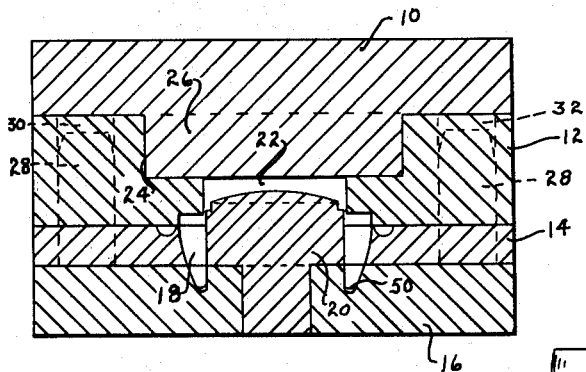
FIG. 4
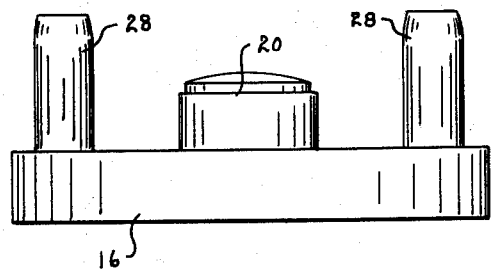
FIG. 8
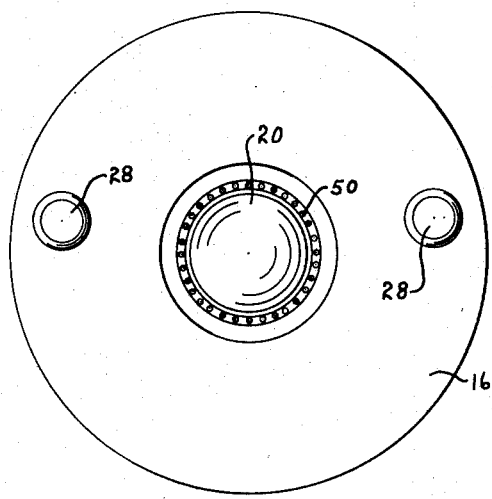
FIG. 9
INVENTOR.
JOHN E. BORAH
BY M. A. Hobbs
ATTORNEY July 2, 1963  J. E. BORAH  3,095,611
MOLD
Filed Jan. 12, 1960  2 Sheets-Sheet 2
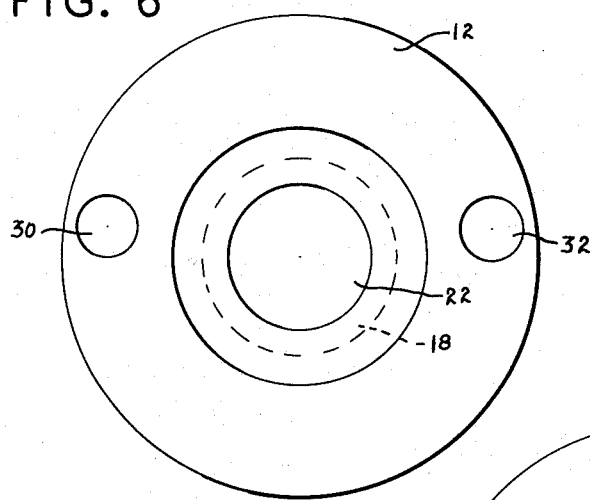
FIG. 6
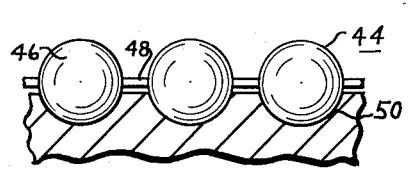
FIG. 10
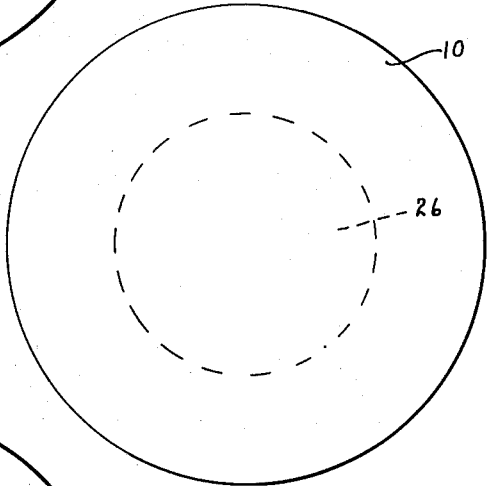
FIG. 11
FIG. 5
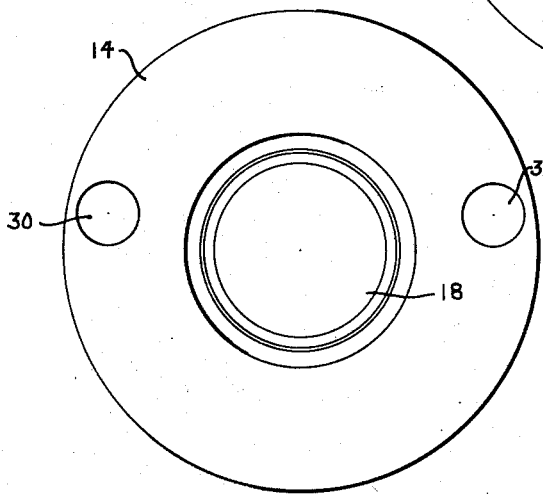
FIG. 7
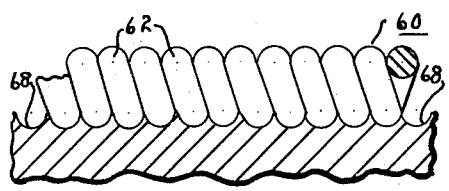
FIG. 12
INVENTOR.
JOHN E. BORAH
BY *M. A. Hobbs*
ATTORNEY United States Patent Office 3,095,611
Patented July 2, 1963

3,095,611
MOLD
John E. Borah, 815 Mishawaka Ave., Mishawaka, Ind.
Filed Jan. 12, 1960, Ser. No. 1,924
5 Claims. (Cl. 18—36)

The present invention relates to a mold and method for producing articles of rubber, such as gaskets and the like, in which an insert is embedded therein during the molding operation.

Gaskets used in forming joints in tubes and pipes frequently contain metal inserts for the purpose of forming good electrical connections between the adjoining sections. These gaskets are annular shaped and are tapered axially toward one edge, and a metal insert consisting of an endless beaded metal chain is partially embedded in the thin edge at the tip of the gasket. Approximately half of each bead is embedded in the rubber and the other half is fully exposed, presenting an intermittent metallic contact between the gasket and adjacent pipe or tube sections. The beaded chain is conventional in construction, consisting of a series of beads connected by short wire-like stems, and in the form used in the gaskets, the ends of the chain are joined to form a complete and continuous circle. In the completed gasket the stems between the beads are fully embedded in the rubber, which holds the chain firmly in place in the gasket even though nearly half of each bead is fully exposed.

In the past, molding operation for producing the foregoing gasket consisted of the tedious task of molding the gasket with the chain fully embedded in the rubber of the gasket without any portion of the chain being exposed, and then buffing the rubber from the spaces between each bead of the gasket until the chain beads were exposed to the extent described above, using a power driven rotary wire brush. This buffing operation was not only time consuming and costly, but required skilled competent labor, often difficult to obtain, and often resulted in injury to the hands of the operator. It is therefore one of the principal objects of the present invention to provide a special mold for making rubber gaskets having a beaded chain insert in which the bead is embedded in the gasket only to the extent desired in the final product, and which eliminates the need for buffing to expose the chain.

Another object of the invention is to provide a mold for producing gaskets having beaded chain or annular coil spring inserts requiring little additional effort and expense to produce over and above the production of the gasket without the chain.

Still another object of the invention is to provide a simplified method of producing gaskets with metal inserts of the aforesaid type which results in an improved and more uniform product.

Further objects and advantages will become apparent from the following description and accompanying drawings, wherein:

FIGURE 1 is a side elevational view of the present mold showing the various parts thereof assembled in operative position;

FIGURE 2 is an elevational end view of one type of gasket produced by the present mold;

FIGURE 3 is a cross sectional view of the gasket shown in FIGURE 2, taken on line 3—3 of the latter figure;

FIGURE 4 is a vertical cross sectional view of the mold taken on line 4—4 of FIGURE 1;

FIGURE 5 is a top plan view of the plunger forming a part of the mold shown in FIGURES 1 and 4;

FIGURE 6 is a top plan view of the pot well of the mold shown in the previous figures;

FIGURE 7 is a top plan view of the center plate of the present mold;

FIGURE 8 is a side elevational view of the bottom plate of the mold;

FIGURE 9 is a top plan view of the bottom plate shown in FIGURE 8;

FIGURE 10 is an enlarged fragmentary cross-sectional view of my mold; and

FIGURES 11 and 12 are enlarged fragmentary cross-sectional views of a mold for a gasket with an annular coil spring therein.

Referring more specifically to the drawings wherein a transfer mold for producing gaskets is shown, numeral 10 designates the plunger, 12 the pot well, 14 the center plate, and 16 the bottom plate. Numeral 18 designates the mold cavity for producing the type of gasket shown in FIGURES 2 and 3, 20 a core insert for forming the hollow interior of the gasket, and 22 the sprue connecting the pot well with the mold cavity. The general construction of the mold may be considered conventional for the purpose of the present description and is adapted to be assembled during the molding operation with moldable material in recess 24 beneath plunger member 26.

The assembled mold containing moldable material is placed in a suitable press wherein the moldable material is forced by plunger 26 at an elevated temperature through sprue 22 into mold cavity 18. The mold is maintained under pressure and at an elevated temperature for sufficient time to permit the rubber in the cavity to cure. The mold is then removed from the press and the four mold sections separated to remove the gaskets from the cavity around core 20 and to remove the waste material remaining in recess 24 and sprue 22. A plurality of pins 28 secured to bottom plate 16 and extending through holes 30 and 32 in center plate 14 and pot well 12 assist in aligning the sections of the mold and holding these sections in proper alignment during the molding operation. In a production mold, a large number of mold cavities 18, cores 20 and sprues 22 are provided; however, since these parts are identical from one to the other, only the ones shown in the drawings will be described in detail herein.

The gasket produced by the above described mold is shown in detail in FIGURES 2 and 3 and consists of an annular body 40 having a susbtantially cylindrical opening 42 therethrough and a tapering external surface extending from the lower edge as seen in FIGURE 3 to the upper edge. An endless beaded chain 44 is partially embedded in the upper inner edge of the gasket, the rubber normally covering approximately half of each bead, leaving the other half fully exposed, though substantially less than half of each bead may be exposed if desired. This chain consists of a series of hollow beads 46 connected by short wire-like stems 48, and the chain is formed into a complete continuous circle of the size of the small end of the gasket. In the past, this type of gasket has been made commercially by placing the beaded chain in the smooth bottom of mold cavity 18 and molding the beaded chain into the tip end of the gasket with the chain being fully embedded in the gasket in the gasket molding process. As previously explained herein, the chain was then exposed by a separate buffing operation in which the rubber was removed from around the chain sufficiently to expose approximately half of each bead. This buffing operation was performed with the use of a wire rotary brush, which was dangerous for the operator to use and which frequently resulted in non-uniformity from one gasket to another.

The present mold design has eliminated the buffing operation by producing initially a gasket having the beaded chain exposed. This has been accomplished by providing a series of hemispherically shaped recesses 50 in the lower portion of the mold cavity 18 for receiving the beads of the chain when the chain is dropped or inserted in the cavity of the mold preparatory to the molding operation. FIGURE 10 illustrates the manner in which the beaded chain seats in the recesses 50, each bead being in direct contact with the mold portions forming the recesses to the extent of approximately half of the bead or to any desired portion thereof.

After the chain has been assembled in the bottom of the mold with the beads seated in their proper recesses 50, the mold sections are then assembled with the moldable material in recess 24 and the assembled mold is then placed in the press wherein plunger member 26 is forced downwardly into recess 24, causing the moldable material to flow through sprue 22 into cavity 18, the fluid rubber completely filling the cavity and surrounding the stems between the beads of the chain and approximately half of each bead of the chain. The downward pressure of the rubber entering the mold cavity seats the beads firmly against the walls defining recesses 50 and prevents the rubber from flowing around the lower side of the beads and thereby prevents the beads from being fully enclosed by rubber. After the mold is maintained under sufficient pressure and temperature to cure the rubber, the press is opened and the mold removed. The sections of the mold are then pried apart or otherwise separated and the gaskets are removed from core 20.

The gaskets on being removed from the mold require very little further processing in order to complete them, in that the beads are properly exposed and thus require no buffing operation as in previous molding operations. Only small flanges or flashes remaining from the sprues and parting surfaces between the mold sections must be removed. This is readily acomplished by tumbling the gaskets in a cylinder containing Dry Ice or other coolant for rendering the flashes sufficiently rigid to break from the gaskets, leaving the surface of the gasket smooth and ready for use.

FIGURES 11 and 12 illustrate a modified form of my mold for producing gaskets having an annular-shaped coil spring embedded therein in place of the beaded chain. The spring insert 60 is normally a closely coiled spring formed into a ring and joined together at its ends to make a continuous annular member of uniform convolutions 62. The ends of the spring may be joined in any suitable manner; however, they are usually connected by a pin or by telescoping one end into the other. In this modified form the lower portion of the mold cavity 18 contains an annular recess 64 for receiving by a snug fit a susbtantial part of the lower half of the annular spring 60 as identified by broken line 66. The pressure of the incoming moldable material holds the spring firmly against the surface of recess 64 and prevents the moldable material from fully enclosing the lower half of the spring. In addition, if desired, the bottom and sides of recess 64 may contain a series of generally radially extending curved grooves 68 normally with little or no intervening space between the grooves. The grooves, which like the recesses for the bead are made by an engraving operation, correspond in shape to the external surface of the spring to be embedded in the gasket. In the molding operation the spring is placed in recess 64. The rubber flows around the part of the spring not in the recess or radial grooves, thereby partially embedding the spring and holding it firmly in place in the gasket. When the gasket is removed from the mold the desired portion of the spring insert is properly exposed without buffing or any further operation being required.

The present mold is not limited to any particular size and shape of gasket and may be used to produce other articles of various materials, such as rubber, rubber-like and plastic materials, in which it is desirable to have partially embedded therein a beaded chain, coil spring or other articulated type structure. Further, the method and mold structure employed herein for molding rubber articles with the beaded chain, coil spring or the like partially embedded therein may be incorporated in other types of molds, either of the transfer type or compression type. Various other changes and modifications may be made without departing from the scope of the present invention.

I claim:

1. A mold for embedding an endless, normally limp chain of beads connected to one another by stems in a gasket of rubber and rubber-like material with the beads forming the chain partially exposed in the gasket as removed from the mold, comprising a pot well member having a recess therein for moldable material, a plunger in said recess, a center plate having a mold cavity section connected by a sprue with said recess, a bottom plate having another mold cavity section forming one end of said gaskets, and a cylindrical core in said latter cavity, said bottom plate having in its cavity a continuous series of hemispherically shaped, upwardly-facing recesses in the bottom thereof of substantially the same radius as the beads of said chain with a spacing from one another substantially the same distance as the spacing between the beads of said chain when the chain is taut.

2. A mold for embedding an endless, normally limp chain of beads connected to one another by stems in a gasket of rubber and rubber-like material with the beads forming the chain partially exposed in the gasket as removed from the mold, comprising a pot well member having a recess therein for moldable material, a plunger in said recess, a bottom plate having an annular mold cavity, and a continuous series of upwardly-facing circular recesses in the bottom of said bottom plate forming a portion of the wall of said cavity, said recesses being of substantially the same radius as the beads of said chain with a spacing from one another substantially the same distance as the spacing between the beads of said chain when taut.

3. A mold for embedding an endless, normally limp chain of beads connected to one another by stems in a gasket of rubber and rubber-like material with the beads forming the chain partially exposed in the gasket as removed from the mold, comprising upper and lower sections forming a mold cavity, a core in said cavity, and a continuous series of upwardly-facing circular recesses in the bottom of said lower section forming a portion of the wall of said cavity, each of said recesses having at its upper end a diameter less than the diameter of the beads of said chain and being spaced from one another substantially the same distance as the spacing between the beads of said chain when taut.

4. A mold for embedding an endless, normally limp chain of beads connected to one another by stems in a gasket of rubber and rubber-like material with the beads forming the chain partially exposed in the gasket as removed from the mold, comprising upper and lower sections forming a mold cavity, and a continuous series of upwardly-facing circular recesses in the bottom of said lower section forming a portion of the wall of said cavity, said recesses being of substantially the same radius as the beads of said chain with a spacing from one another substantially the same distance as the spacing between the beads of said chain when taut.

5. A mold for embedding an endless, normally limp chain of beads connected to one another by stems in a gasket of rubber and rubber-like material with the beads forming the chain partially exposed in the gasket as removed from the mold, comprising sections forming a mold cavity with a bottom, and a continuous series of upwardly-facing recesses in said bottom, said recesses being of substantially the same shape as a portion of the beads of said chain when taut and being of such a substantially the same distance as the spacing between the beads of said chain with a spacing from one another size with relation to the size of the beads that the stems are held in spaced relation from the bottom of the mold.

References Cited in the file of this patent

UNITED STATES PATENTS

| | | |
|---|---|---|
| 2,030,132 | Apple | Feb. 11, 1936 |
| 2,130,254 | Visman | Sept. 13, 1938 |
| 2,259,242 | Clark | Oct. 14, 1941 |
| 2,378,901 | Amrheim et al. | June 26, 1945 |
| 2,451,912 | Bradley | Oct. 19, 1948 |